Nov. 13, 1928. Re. 17,131

O. S. CAESAR

HEATING APPARATUS FOR AUTOMOTIVE VEHICLES

Original Filed Feb. 7, 1927 2 Sheets-Sheet 1

INVENTOR
ORVILLE S. CAESAR
By Paul Paul & Moore
ATTORNEYS

Nov. 13, 1928. Re. 17,131

O. S. CAESAR

HEATING APPARATUS FOR AUTOMOTIVE VEHICLES

Original Filed Feb. 7, 1927 2 Sheets-Sheet 2

INVENTOR
ORVILLE S. CAESAR
By Paul, Paul & Moore
ATTORNEYS

Reissued Nov. 13, 1928. Re. 17,131

UNITED STATES PATENT OFFICE.

ORVILLE S. CAESAR, OF CHICAGO, ILLINOIS, ASSIGNOR TO TROPIC-AIRE, INCORPORATED, OF MINNEAPOLIS, MINNESOTA, A CORPORATION OF DELAWARE.

HEATING APPARATUS FOR AUTOMOTIVE VEHICLES.

Original No. 1,668,490, dated May 1, 1928, Serial No. 166,544, filed February 7, 1927. Application for reissue filed August 23, 1928. Serial No. 301,665.

This invention relates to new and useful improvements in apparatus for heating the interiors of automotive vehicles such, for instance, as sedans and buses, and an object of the invention is to provide such an apparatus comprising a heating member having a connection with the water-circulating system of the vehicle engine whereby hot water will be circulated through the member, means being provided in connection with the heating member for forcing the air within the vehicle body therethrough to heat it and to keep such heated air in continuous circulation within the vehicle body.

A further object of the invention is to provide an air-heating member adapted to be mounted within a vehicle body and having a connection with the water-circulating system of the engine and, further, having means for diverting substantially all or a portion of the water through the heating member to heat the interior of the vehicle body.

A further object is to provide such an apparatus including an air-heating member comprising a plurality of horizontally disposed, spaced tubes, each adapted to be surrounded by water, said member having means for connecting it to the water-circulating system of an internal combustion engine, whereby a circulation of hot water may be established therethrough, a valve being interposed in the connection between the intake and discharge conduits of the heating member whereby the flow of water through the heating member may be controlled.

A further object is to provide a combination hot water and air-heating apparatus for automotive vehicles, comprising a heat-radiating member having an electrically operated fan mounted adjacent thereto for circulating the air within the vehicle body through the heating member, and means such as a rheostat for controlling the speed of the motor-driven fan whereby the circulation of heated air within the vehicle body may be controlled independently of the vehicle engine.

A further object is to provide a hot water heating member, comprising a plurality of horizontally disposed tubes arranged in spaced parallel relation, whereby water-circulating passages will be provided between the tubes and each tube will be completely surrounded by water, thus providing a heating member which will quickly heat the air circulated through the tubes by the action of the fan or blower means mounted adjacent to the heating member.

A further object is to provide a heating apparatus for automotive vehicles of simple and inexpensive construction, comprising few parts, and, which may readily and quickly be installed in a vehicle and connected to the usual water-circulating system thereof, in a comparatively short period of time without the necessity of having to make numerous alterations to the usual connections or fittings of the vehicle engine.

Other objects of the invention will appear from the following description and accompanying drawings and the novel features will be pointed out in the annexed claims.

In the drawings there has been disclosed a structure designed to carry out the various objects of the invention, but it is to be understood that the invention is not confined to the exact features shown, as various changes may be made within the scope of the claims which follow.

In the accompanying drawings forming part of this specification:

In the selected embodiment of the invention here shown, for purposes of disclosure, there is illustrated a portion of an automotive vehicle comprising the usual engine 11, water-cooling radiator 12 and the connection 13 connecting the water-jacket of the engine with the radiator 12.

Figure 1:
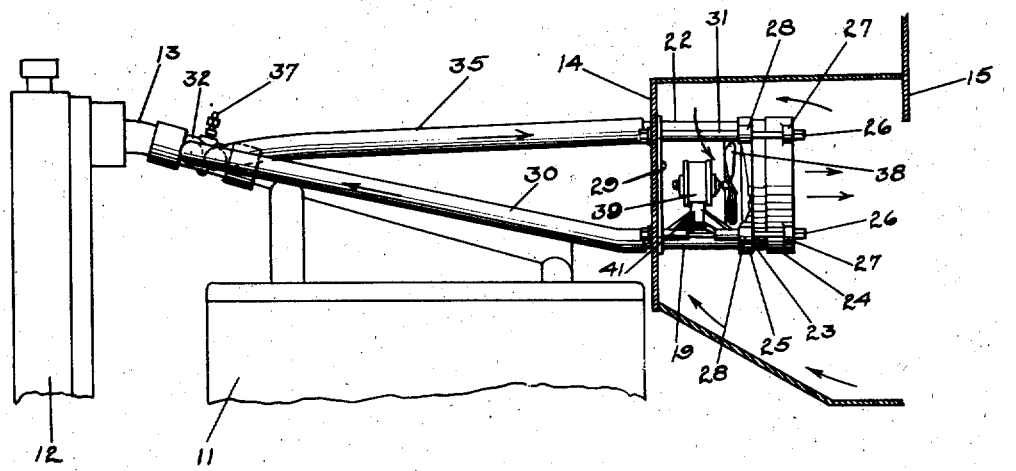
Figure 1 is a view in side elevation of the improved heating member, showing the preferred manner of connecting it to the engine water-circulating system.
Figure 2:
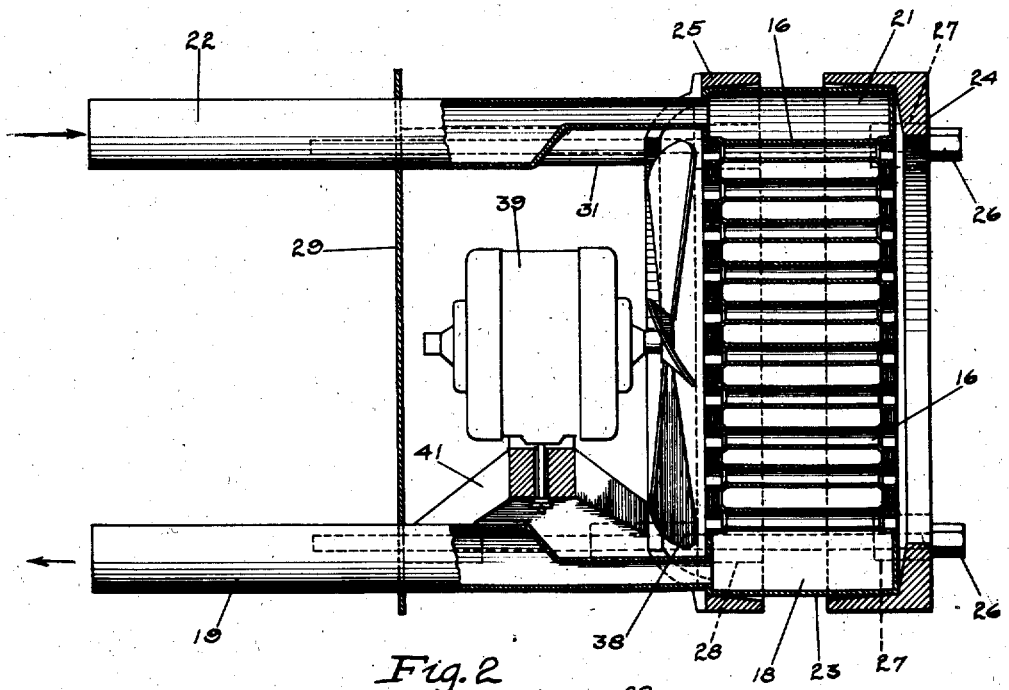
Figure 2 is an enlarged detailed sectional view showing the general construction of the heating member and the arrangement of the fan in connection therewith for forcing air through the heating member.

The novel heating apparatus featured in this invention is best shown in Figures 1 and 2, and comprises an air-heating member adapted to be suitably mounted or secured within the vehicle body, as, for instance, to the usual dash 14 of the vehicle beneath the instrument board 15, as shown in Figure 1. The air-heating member comprises a plurality of horizontally disposed tubes 16 having their ends suitably secured together, as shown at 17 in Figure 6. A water chamber 18 is provided in the lower portion of the heating member and has an outlet pipe 19 connected therewith. A similar water chamber 21 is provided in the upper portion of the heating member and has an intake pipe 22 similarly connected therewith. The chambers 18 and 21 communicate with the water-circulating passages between the tubes 16 so that when water is circulated through the heating member, all of the tubes will be completely surrounded by hot water. The outer walls of the water chambers 18 and 21 are formed by an annular plate or wall 23 arranged to encircle all of the tubes, and to provide a casing therefor. Frames 24 and 25 are clamped to the casing 23 of the heating member to provide a reinforcement therefor and to present a finished and neat appearance. The annular frames 24 and 25 are secured to the casing 23 by means of tie-bolts 26, passing through apertured ears 27 and 28 provided respectively in the frames 24 and 25, and each having one end passing through a plate 29 adapted to be seated against the dash-board 14 of the vehicle. The inner ends of the tie-bolts 26 pass through apertures provided in the dash 14 and have washers and nuts mounted thereon for securing the heating member to the dash 14. Spacing sleeves 31 are mounted upon the upper tie-bolts 26 to space the plate 29 from the inner frame 25. The inner ends of the discharge and intake pipes 19 and 22 pass through suitable apertures provided in the dash 14.

Figure 5:
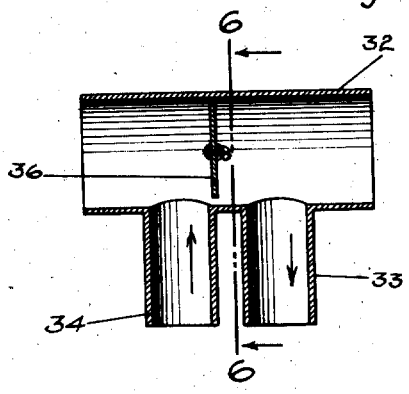
Figure 5 is an enlarged detailed sectional view of the fitting adapted to be interposed in the connection between the engine water-jacket and the water-cooling radiator for diverting water through the air-heating member.
Figure 6:
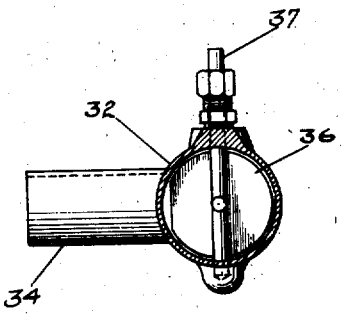
Figure 6 is a detailed sectional view on the line 6—6 of Figure 5.
Figure 4:
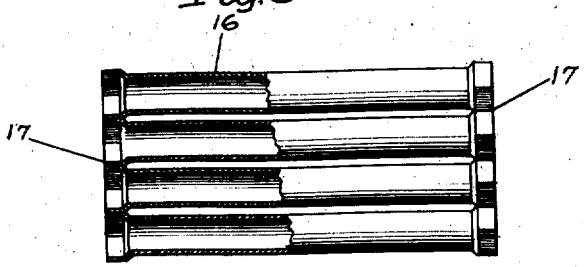
Figure 4 is an enlarged detailed view, partially in section, showing a portion of the heating member.

A fitting 32 is interposed in the connection 13 between the engine water-jacket and the radiator 12. This fitting is provided with tubular extensions 33 and 34, preferably arranged at one side of the fitting as shown in Figures 5 and 6. Conduits 30 and 35, preferably flexible, connect the pipes 19 and 22 respectively with the extensions 33 and 34, as shown in Figure 1. A valve 36, preferably of the butterfly type, is mounted in the fitting 32 between the tubular extensions 33 and 34. This valve 36 is operable from the exterior of the fitting by means of a shaft or rod 37 shown in Figure 6. By means of this valve, substantially all or a portion of the water flowing from the engine water-jacket to the radiator 12, may be diverted through the heating member for heating the interior of the vehicle body.

Figure 7:
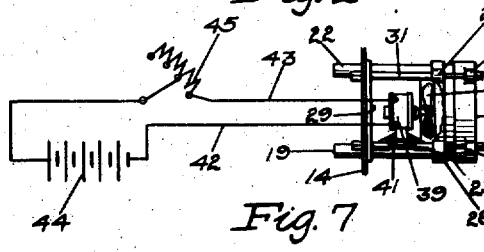
Figure 7 is a wiring diagram showing the means provided in the motor circuit for controlling the speed of the blower fan.
Figure 3:
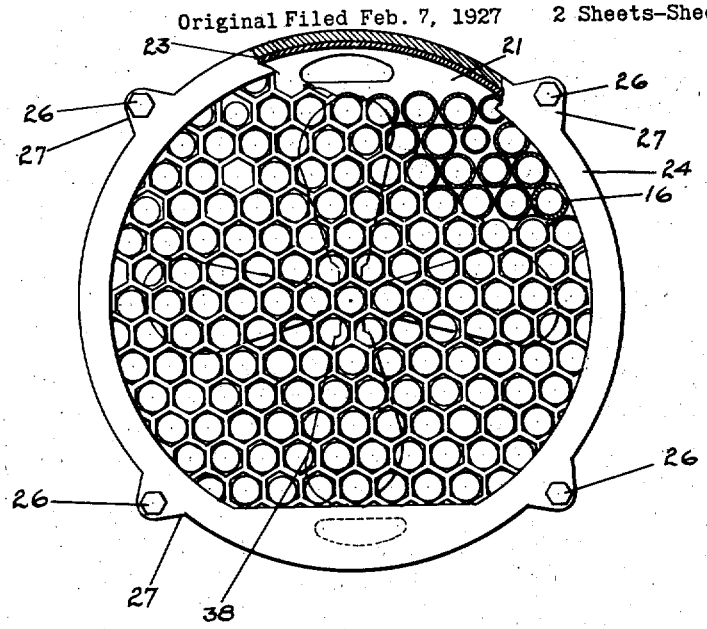
Figure 3 is a front elevation of the heating member.

Means are provided for establishing a forced circulation of heated air within the vehicle body. Such means consists of a fan 38 mounted back of the heating member between the tubes 16 and the plate 29, and is operable by a small motor 39 mounted upon a spider or frame 41 carried by the lower tie-bolts 26, as shown in Figures 1 and 2. The motor 39 is electrically connected by conductors 42 and 43 to a suitable source of electrical energy such as the storage battery 44 of the vehicle. (See Figure 7.) A small rheostat 45, of ordinary construction is connected in series with the conductor 43 and provides means for controlling the speed of the motor-driven fan 38. This rheostat is preferably mounted upon the instrument board of the vehicle so that it may be conveniently manipulated by the driver to control the circulation of heated air within the vehicle body. This rheostat has been found very useful in actual practice as it provides a positive means for controlling the heating of the interior of the vehicle, regardless of the temperature of the water circulating through the heating member. This will readily be seen when it is understood that the heating of the interior of the vehicle body is governed largely by the circulation of the heated air therein, as for instance, when the fan is operating at high speed, the air within the vehicle body will be rapidly circulated through the heater, thus heating it to a comparative high temperature, while, on the other hand, when the fan is inoperative, the circulation of the air within the vehicle body will be practically at zero. By the employment of the fan 38 to forcibly circulate the air through the heating member, the latter may be made relatively small and compact in size without jeopardizing its heating efficiency. This is an important factor, as the heater will require very little space in the vehicle as compared to the amount of space usually required by automobile heaters of ordinary construction. Also, as a result of its compactness, practically no heat will be dissipated from the heater when the fan 38 is inoperative. The rheostat, therefore, has been found an important adjunct in connection with the above described heating apparatus. By heating the interior of the vehicle body, as above described, the usual danger of monoxide gas entering the vehicle, as when using various forms of heaters now in common use, is eliminated. The foul or gaseous air usually found beneath the engine hood is also excluded from the interior of the vehicle body, it being understood that the air heated and circulated within the vehicle body is that confined therein only, or that which enters through cracks or crevices in the vehicle body or through doors and windows, when the latter are opened and closed.

An important feature of the invention resides in the general construction of the heating member and the air-circulating means which, it will be noted by reference to Figure 2, are assembled as a unit. By thus assembling as a unit the heating member and the blower and fan, the installation of the heater in the vehicle is greatly simplified. The construction of the heating member is such that each tube 16 is completely surrounded by water so that the air, blown or circulated through the tubes by the fan 38, will be quickly heated to a relatively high temperature in passing therethrough. It has been found from actual practice, that by lengthening the tubes 16, the velocity or circulation of the air therethrough for a given water temperature may be decreased without decreasing the effective heating of the interior of the vehicle, as a result of the increased length of the tubes subjecting the circulated air to a greater heating surface or area. In actual operation it has been found that by making the tubes approximately 4 inches in length, that sufficient air-heating surface is presented to the air passing therethrough, whereby the velocity of the air may be reduced to a minimum, thereby eliminating any danger of the motor 39 being overloaded, when operating to circulate the air within the vehicle body to maintain a comfortable temperature therein on an extremely cold day.

The valve 36 within the fitting 32, provides means whereby the flow of water through the heating-member may be controlled or regulated at will. It has been found, however, that by varying the speed of the motor fan 38, the temperature within the vehicle body may be regulated to the desired degree without having to manipulate the water-control valve 36.

It is apparent that by cutting off the flow of the engine water circulating system, from the hot-water air-heater, say, by means of the valve 36, and operating the fan 38 by the motor 39 air will be circulated throughout the vehicle body at a rate depending on the speed of rotation of the fan under control of the rheostat of the electric motor so as to cool or lower the temperature of the air within the vehicle body without obnoxious fumes entering from the chamber which contains the engine.

I claim as my invention:

1. A hot-liquid heating system for motor-driven vehicles comprising an engine circulating-liquid cooling system including an engine cooling-medium jacket and radiator, a valve positioned between the engine cooling-medium jacket and radiator for controlling the flow of the cooling-medium from the jacket to the radiator and its return, a liquid-heated air-heater positioned within the body of the vehicle and in communication with the engine circulating liquid-cooling system, means disposed between the liquid-heated air-heater and an engine-containing chamber to prevent passage of noxious gases and fumes from the engine-containing chamber into the space containing the liquid-heated air-heater, and a fan within the space containing the liquid-heated air-heater for circulating heated air within the vehicle body.

2. A hot-liquid heating system for motor-driven vehicles comprising an engine circulating liquid-cooling system including an engine cooling-medium jacket and radiator, a valve positioned between the engine cooling-medium jacket and radiator for controlling the flow of the cooling-medium from the jacket to the radiator and its return, a liquid-heated air-heater positioned within the body of the vehicle and in communication with the engine circulating liquid-cooling system, means disposed between the liquid-heated air-heater and an engine-containing chamber to prevent passage of noxious gases and fumes from the engine containing chamber into the space containing the liquid-heated air-heater, a fan within the space containing the liquid heated air-heater for circulating heated air within the vehicle body, and fan regulating means to control the circulation of heated air within the body of the vehicle.

3. A hot-liquid heating system for motor-driven vehicles comprising an engine circulating liquid-cooling system including an engine cooling-medium jacket and radiator, a valve positioned between the engine cooling-medium jacket and radiator for controlling the flow of the cooling-medium from the jacket to the radiator and its return, a liquid-heated air-heater positioned within the body of the vehicle and in communication with the engine circulating-liquid cooling system, means disposed between the liquid-heated air-heater and an engine-containing chamber to prevent passage of noxious gases and fumes from the engine-containing chamber into the space containing the liquid-heated air-heater, an electric motor-driven fan to circulate heated air within the vehicle body, and means for regulating the speed of the motor to control the circulation of air within the body of the vehicle.

4. A hot-liquid heating system for motor-driven vehicles comprising an engine circulating liquid-cooling system including an engine cooling-medium jacket and radiator, a valve positioned between the engine cooling-medium jacket and radiator for controlling the flow of the cooling-medium from the jacket to the radiator and its return, a liquid-heated air-heater and air-distributer unit comprising a liquid-heated air-heater element, in communication with the engine circulating liquid-cooling system, and an electric motor operated fan, installed in the body of the vehicle, and means disposed between said unit and an engine-containing chamber to prevent passage of noxious gases and fumes from the engine-containing chamber into the space wherein is installed said air-heater and air-distributing unit.

5. A hot-liquid heating system for motor-driven vehicles comprising an engine circulating liquid-cooling system including an engine cooling-liquid jacket and radiator, a liquid-heated air-heater and air distributor unit comprising a liquid-heated air-heater element in communication with the engine circulating liquid-cooling system and provided with air-circulating tubes to be encompassed by the liquid in the element, an electric motor operated fan for passing air through the tubes, said unit comprising the air-heater and air-circulator being installed in the body of the vehicle, means disposed between said unit and an engine-containing chamber to prevent passage of noxious gases and fumes from the engine-containing chamber into the space in which is installed the liquid-heated air-heater and air distributer unit, and means for diverting substantially all the circulating medium of the engine cooling system to the hot-liquid air-heater unit.

6. A heating system for motor-driven vehicles, comprising an engine cooling system including an inter-communicating jacket and radiator for a circulating cooling liquid, an air heating and distributing unit embodying a liquid receiving chamber in communication with the engine cooling system to form in conjunction with said system a circuit for circulation of liquid between said receiving chamber and engine cooling system, said receiving chamber being traversed by air passageways for heating air traveling through the passageways by heated liquid received from the engine cooling system, and a variable-speed fan positioned in relatively close relation to the liquid receiving chamber for causing a more or less frequent recirculation of air through the liquid receiving chamber and the interior of the vehicle to be heated for effecting controlled variations of temperature within the interior of the vehicle, said liquid receiving chamber and fan being located within the interior of the vehicle and isolated from exhaust gases and fumes generated by the engine of the vehicle.

7. A heating system for motor-driven vehicles, comprising an engine cooling system including an inter-communicating jacket and radiator for a circulating cooling liquid, an air heating and distributing unit embodying a liquid receiving chamber in communication with the engine cooling system to form in conjunction with said system a circuit for circulation of liquid between said receiving chamber and engine cooling system, said receiving chamber being traversed by air passageways for heating air traveling through the passageways by heated liquid received from the engine cooling system, and a fan positioned in relatively close relation to the liquid receiving chamber for causing a circulation of air through the liquid receiving chamber and the interior of the vehicle to be heated, said liquid receiving chamber and fan being located within the interior of the vehicle and isolated from exhaust gases and fumes generated by the engine of the vehicle.

8. A heating system for motor-driven vehicles, comprising an engine cooling system including an inter-communicating jacket and radiator for a circulating cooling liquid, an air heating and distributing unit embodying a liquid receiving chamber in communication with the engine cooling system to form in conjunction with said system a circuit for circulation of liquid between said receiving chamber and engine cooling system, said receiving chamber being traversed by air passageways for heating air traveling through the passageways by heated liquid received from the engine cooling system, and a fan positioned in relatively close relation to the liquid receiving chamber for causing a circulation of air through the liquid receiving chamber and the interior of the vehicle to be heated, said liquid receiving chamber being located within the interior of the vehicle and isolated from exhaust gases and fumes generated by the engine of the vehicle and being spaced from the front wall of the vehicle body and said fan being located between said liquid receiving chamber and said front wall of the vehicle body.

9. A heating system for motor-driven vehicles, comprising an engine cooling system including an inter-communicating jacket and radiator for a circulating cooling liquid, an air heating and distributing unit located to heat and distribute air through the interior of the vehicle and embodying a liquid receiving chamber in communication with the engine cooling system to form in conjunction with said system a circuit for circulation of liquid between said receiving chamber and engine cooling system, said receiving chamber being traversed by air passageways for heating air traveling through the passageways by heated liquid received from the engine cooling system, and means for causing a forced circulation of air through said passageways in the liquid receiving chamber and the interior of the vehicle to be heated, said liquid receiving chamber and air forcing means being isolated from exhaust gases and fumes generated by the engine of the vehicle body.

10. A heating system for motor driven vehicles comprising an engine cooling system including a communicating jacket and radiator for a circulating cooling liquid, an air heating and distributing unit located within the vehicle body and in communication with the engine cooling system to form in conjunction with said system a circuit for circulation of liquid between said unit and engine cooling system, said heating unit being traversed by air passageways for heating air traveling through the passageways by heated liquid received from the engine cooling system, means for causing a forced circulation of air in contact with the air heating unit and through the interior of the vehicle to be heated said air heating unit and air forcing means being isolated from exhaust gases and fumes generated by the engine of the vehicle.

11. A heating system for motor-driven vehicles, comprising an engine cooling system including an inter-communicating jacket and radiator for a circulating cooling liquid, an air heating and distributing unit embodying a liquid receiving chamber in communication with the engine cooling system to form in conjunction with said system a circuit for circulation of liquid between said receiving chamber and engine cooling system, said receiving chamber being traversed by air passageways for heating air traveling through the passageways by heated liquid received from the engine cooling system, and means for causing a forced circulation of air through said passageways in the liquid receiving chamber and the interior of the vehicle to be heated, said liquid receiving chamber being located within the interior of the vehicle and said chamber and air forcing means being isolated from exhaust gases and fumes generated by the engine of the vehicle.

12. A heating system for motor driven vehicles comprising an engine cooling system including an inter-communicating engine jacket and radiator for a circulating cooling liquid, and an air heating and distributing unit in communication with and forming a part of a branch of the liquid circuit of the engine cooling system, said air heating and distributing unit being formed for the passage therethrough of air and of heated liquid from the engine cooling system in heat exchange relation to each other, means for creating forced circulation of air in contact with said air heating and distributing unit, said unit and said means for creating forced air circulation being located within the interior of the vehicle and isolated from exhaust gases and fumes generated from the engine of the vehicle.

13. A hot liquid heating system for motor driven vehicles comprising an engine circulating liquid cooling system including an engine cooling medium jacket and radiator and means for producing a flow of the cooling medium from the jacket to the radiator and its return, a liquid heated air heater positioned within the body of the vehicle and in communication with the engine circulating liquid cooling system, means disposed between the liquid heated air heater and an engine containing chamber to prevent passage of noxious gases and fumes from the engine-containing chamber into the space containing the liquid-heated air-heater and a fan within the space containing the liquid-heated air-heater for circulating air in contact with said air heater and within the vehicle body.

In witness whereof, I have hereunto set my hand this 15th day of August, 1928.

ORVILLE S. CAESAR.